(12) United States Patent
Welch

(10) Patent No.: US 7,573,867 B1
(45) Date of Patent: Aug. 11, 2009

(54) METHOD AND SYSTEM FOR MAINTAINING A RADIO LINK CONNECTION DURING ABSENCE OF REAL-TIME PACKET DATA COMMUNICATION

(75) Inventor: David Welch, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1089 days.

(21) Appl. No.: 10/623,439

(22) Filed: Jul. 17, 2003

(51) Int. Cl.
*H04L 12/28* (2006.01)
*H04L 12/66* (2006.01)
*H04L 12/56* (2006.01)
*H04L 5/16* (2006.01)

(52) U.S. Cl. .................. 370/352; 370/389; 370/401; 375/222

(58) Field of Classification Search ........... 370/465, 370/505, 352–356; 375/222
See application file for complete search history.

(56) References Cited

U.S. PATENT DOCUMENTS

| | | | |
|---|---|---|---|
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A * | 3/1999 | Lekven et al. | 455/574 |
| 5,936,964 A | 8/1999 | Valko et al. | |
| 5,983,099 A | 11/1999 | Yao et al. | |
| 5,983,114 A * | 11/1999 | Yao et al. | 455/509 |
| 6,014,556 A | 1/2000 | Bhatia et al. | |
| 6,032,051 A | 2/2000 | Hall et al. | |
| 6,041,241 A | 3/2000 | Willey | |
| 6,088,600 A * | 7/2000 | Rasmussen | 455/574 |
| 6,119,017 A | 9/2000 | Cassidy et al. | |
| 6,128,298 A * | 10/2000 | Wootton et al. | 370/392 |
| 6,178,323 B1 | 1/2001 | Nagata | |
| 6,381,467 B1 | 4/2002 | Hill et al. | |
| 6,490,452 B1 | 12/2002 | Boscovic et al. | |
| 6,526,377 B1 | 2/2003 | Bubb | |

(Continued)

FOREIGN PATENT DOCUMENTS

EP 0 817 457 1/1998

(Continued)

OTHER PUBLICATIONS

International Search Report from International Application No. PCT/US02/31411, dated Mar. 4, 2003.

(Continued)

*Primary Examiner*—Wing F Chan
*Assistant Examiner*—Marcus R Smith

(57) ABSTRACT

A method and system for maintaining a radio link during absence of packet-based real-time media communication, such as RTP packet flow for instance. A wireless device determines that there has been an absence of packet-based real-time media flow for a threshold period of time and responsively sends a keepalive signal into the network to prevent its radio link from timing out. Further, the device may then periodically continue to send keepalive signals into the network to continue maintaining its radio link. By maintaining the radio link, the wireless device can then engage in further packet-based real-time media communication or associated packet-based signaling without the need to re-acquire a radio link.

17 Claims, 3 Drawing Sheets

U.S. PATENT DOCUMENTS

| | | | |
|---|---|---|---|
| 6,768,720 B1* | 7/2004 | Kamstra et al. ............. | 370/245 |
| 6,904,288 B2 | 6/2005 | Rosen et al. | |
| 6,912,401 B2 | 6/2005 | Rosen et al. | |
| 6,917,587 B1* | 7/2005 | Sarkar et al. ................ | 370/230 |
| 6,973,051 B2* | 12/2005 | Brouet et al. ............... | 370/278 |
| 7,072,941 B2* | 7/2006 | Griffin et al. ................ | 709/204 |
| 7,088,698 B1* | 8/2006 | Harsch ....................... | 370/338 |
| 7,463,652 B2* | 12/2008 | Karol et al. ................. | 370/476 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |
| 2003/0021264 A1 | 1/2003 | Zhakov et al. | |
| 2003/0114156 A1 | 6/2003 | Kinnavy | |

FOREIGN PATENT DOCUMENTS

| | | |
|---|---|---|
| EP | 0 984 608 | 3/2000 |

OTHER PUBLICATIONS

International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
$3^{rd}$ Generation Partnership Project 2 "3GPP2", Fast Call Set-Up, Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Loack Coordination," Network Working Group, Internet-Draft, May 30, 2001.
TR45, Medium Access Control (MAC) Standard for cdma2000 Spread Spectrum System, IS-2000-3, Jul. 12, 1999.
$3^{rd}$ Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
OMA, Discussion and definitions of PoC Floor Control, Input Contribution, Doc #OMA-REQ-2003-0375-PoC_Floor_Control, Jun. 2, 2003.
OMA, "PoC Use case: Mobile—PC Example," Input Contribution, Doc #OMA-REQ-2003-0323 PoC Mobile-PC use case, May 5, 2003.
OMA, "PoC Use case: Multimedia Group Call Example," Input Contribution, Doc #OMA-REQ-2003-0306-PoC UseCase-group-multimedia-scenario, May 6, 2003.
OMA, "PoC Use case: Examples of User Requirements," Input Contribution, Doc #OMA-REQ-2003-0305-PoC Use Case, May 6, 2003.
OMA, "Inputs for PoC Requirements Document," Input Contribution, Doc #OMA-REQ-2003-0367-PoC_Input_Motorola, May 29, 2003.
OMA, "Push to Talk over Cellular (PoC)," Version: 0.1.6, May 12, 2003.
International Search Report from International Application No. PCT/US2003/02950, dated Jan. 30, 2003.
Office Action from U.S. Appl. No. 10/067,080, dated May 21, 2003.
Office Action from U.S. Appl. No. 10/067,080, dated Apr. 27, 2004.

* cited by examiner

METHOD AND SYSTEM FOR MAINTAINING A RADIO LINK CONNECTION DURING ABSENCE OF REAL-TIME PACKET DATA COMMUNICATION

BACKGROUND

1. Field of the Invention

The present invention relates to wireless communications and, more particularly, to wireless communication of packet-based real-time media.

2. Description of Related Art

As a general matter, it is known for a wireless device to engage in packet-based real-time media communication with one or more other entities. In particular, such a device could be equipped to engage in packet-data communications via a radio access network, and to send and receive media in real-time as packet data.

An example of such a device is a cellular mobile station of the type that might communicate over an air interface with a base station and in turn with a gateway that provides connectivity with a packet-switched network. Such a mobile station can be equipped with hardware and program logic to be able to digitize, encode and packetize real-time media and transmit resulting media packets via the packet-switched network. Further, the mobile station can be similarly equipped to receive and de-packetize incoming media packets from the network and to decode and play out the underlying media to a user.

In this manner, the wireless device can allow a user to engage in real-time communication with one or more other users, each of whom operates another device that also has access to the packet-switched network. Such communication could be peer-to-peer, in that the devices exchange media packets with each other. Alternatively, the communication could be bridged through a central conference server of some sort, in which case each device would engage in packet-based media communication with the server and the server would bridge the communications together to allow the users to communicate with each other.

Wireless connectivity, however, presents a challenge for this sort of real-time communication. The difficulty stems from the fact that, in many wireless communication systems, the wireless connection through which packet-data passes between a wireless device and a radio access network will time out after a certain period of inactivity (i.e., absence of packet-data flow). Thereafter, in order for the device to send or receive further packet-data, the device must re-acquire a radio link. But the process of acquiring a radio link can sometimes take on the order of 6-10 seconds.

During a packet-based real-time media session, if a long pause in communication occurs such that none of the participating devices are sending or receiving media packets for longer than the radio link time-out period, a participating wireless device may lose its radio link. In turn, if that device seeks to send or receive further media packets, significant delay could occur as the device works to re-acquire a radio link. This delay can be disruptive and therefore undesirable.

SUMMARY

The present invention is directed to a method and system for maintaining a radio link, so as to facilitate more seamless real-time media communications. Further, the invention may have other ancillary benefits as well.

According to an exemplary embodiment of the invention, a wireless device will detect the absence of real-time media communication to or from the wireless device for at least a threshold period of time and will responsively begin sending periodic (or sporadic) keepalive signals into the network in order to hold open its radio link, i.e., to prevent its radio link from timing out. A suitable keepalive signal can be any packet-data, if transmission of any packet-data would cause the radio access network to reset its radio link timer. Preferably, the wireless device will send keepalive signals at a periodic interval that is shorter than the radio link time-out period, to prevent the radio link from timing out for at least some time.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

As described above, a wireless device can engage in packet-based real-time media communication directly with another device or via a conference server. For sake of example, this description will focus on the latter scenario. More particularly, this description will consider a system in which a cellular mobile station may engage in voice over packet (VoP) communication with another station via a communication server. It should be understood, however, that the invention could apply more generally in any scenario where a wireless device engages in packet-based communication of real-time media, whether peer-to-peer or bridged, and whether voice, video and/or another sort of media.

1. EXAMPLE COMMUNICATION SYSTEM

Figure 1:
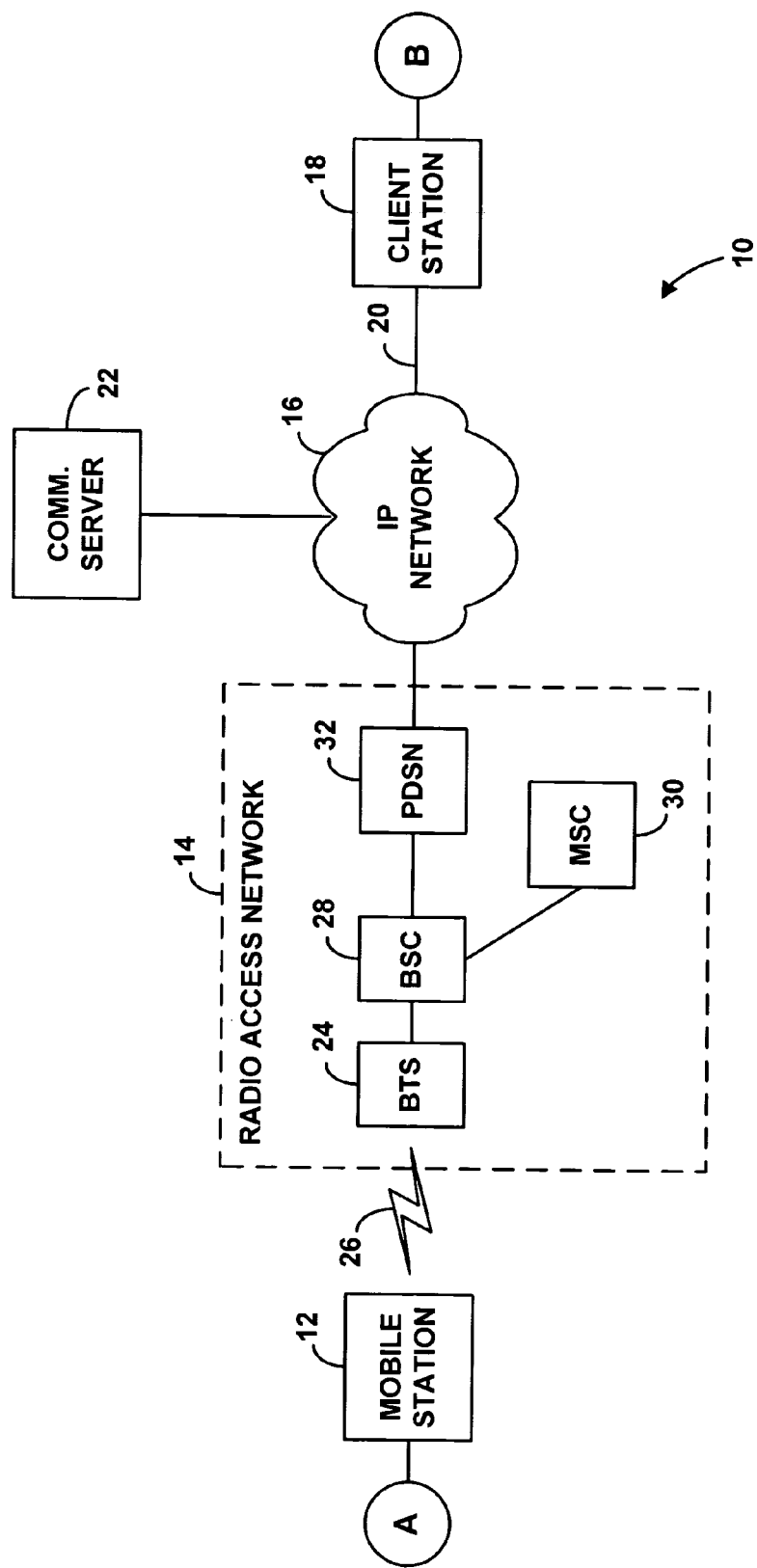
FIG. 1 is a block diagram of a communication system in which the exemplary embodiment can be employed.

Referring to the drawings, FIG. 1 illustrates a communication system 10 in which an exemplary embodiment of the present invention can be employed. Note that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and as a combination of hardware, firmware and/or software.

System 10 includes a mobile station 12 that can be linked by a radio access network 14 with a packet-switched network such as IP network 16. Further, system 10 includes another client station 18 (e.g., another mobile station) that can be linked with the IP network by a connection 20 (e.g., the same or another radio access network). Mobile station 12 serves a user designated as user A, and client station 18 serves a user designated as user B.

Still further, system 10 includes a communication server 22 that sits on the IP network 16 and functions to bridge real-time media communications between mobile station 12 and client station 18. Communication server may be a conference server, for instance, or could take other forms.

Radio access network 14 provides wireless connectivity with IP network 16 and can take any of a variety of forms. By way of example, radio access network 14 may include a base transceiver station (BTS) 24 that can communicate with mobile station 12 over an air interface 26. BTS 24 may then be coupled with a base station controller (BSC) 28, which may in turn be coupled with a mobile switching center (MSC) 30 and with a packet data serving node (PDSN) 32 or other gateway to the IP network 16.

In order for mobile station 12 to be able to engage in packet-data communication over IP network 16, mobile station 12 may need to acquire a radio link layer connection over air interface 26 and a data link layer connection with PDSN 32 or another gateway to network 16. The process of acquiring these links can take various forms depending on the protocols used for communication.

By way of example, under well known "cdma2000" recommendations, mobile station 12 might request a packet-data connection by sending a packet-data origination request message over air interface 26, and via BSC 28, to MSC 30. MSC 30 may then responsively detect that the message is a request for packet-data connectivity and therefore send the message back to the BSC for handling.

In turn, when the BSC receives the request from the MSC, the BSC may establish a radio link layer connection with the mobile station, by assigning the mobile station to operate on a particular traffic channel over air interface 26 (e.g., a fundamental traffic channel, and perhaps one or more supplemental channels). In addition, the BSC may pass the request to the PDSN 32. And the PDSN and mobile station may then negotiate with each other to establish a data-link layer connection, typically a point-to-point protocol (PPP) session over which packet data can be communicated between the mobile station and the PDSN.

As part of this process, mobile station 12 may obtain an IP address, to facilitate packet communications. For instance, the PDSN may assign an IP address to the mobile station, or the PDSN may communicate with a mobile-IP "home agent" to obtain an IP address for the mobile station.

As noted above, the radio-link layer connection with a mobile station in many wireless communication systems will time-out after a predefined period of inactivity. For instance, after 10 seconds in which no packet-data is communicated to or from the mobile station over air interface 26, the BSC 28 may release the traffic channel that it had assigned to the mobile station, to allow it to be used by other mobile stations. At the same time, however, the data-link layer (e.g., PPP) connection with the mobile station might remain.

Once the radio-link layer connection with a mobile station has timed out, the mobile station will be considered "dormant." (For this reason, the timer is typically referred to as an "active-to-dormant" timer.) However, if its data-link layer connection still exists, the mobile station may still seek to send packet data to other entities, and other entities may seek to send packet data to the IP address of the mobile station. When another entity seeks to send packet data to the mobile station, the BSC will page the mobile station over an air interface paging channel.

When a dormant mobile station receives a page indicative of an incoming data communication, or if the dormant mobile station seeks to send data, the radio link layer connection with the mobile station will need to be reestablished. To do so, the mobile station may send a message to the BSC over the access channel, requesting radio-link resources, and the BSC may then assign a traffic channel. The mobile station may then send or receive packet data over that traffic channel.

2. EXAMPLE PACKET-BASED REAL-TIME MEDIA COMMUNICATION

Mobile station 12, communication server 22 and client station 18 are each preferably equipped to engage in packet-based real-time media communications according to the well known Real-time Transport Protocol (RTP), which is defined by Internet Engineering Task Force (IETF) Request for Comments (RFC) 1889. More particularly, each of these nodes is preferably equipped to send and receive RTP packet streams carrying digital representations of media such as voice. Further, mobile station 12 and client station 18 are each preferably able to generate RTP streams from analog media and to play out analog media from RTP streams. And communication server 22 is preferably able to pass RTP communications between mobile station 12 and client station 18.

Thus, mobile station 12 may receive voice from user A and transmit a digital representation of the voice in an RTP stream to communication server 22, and communication server 22 can then pass that digital representation along in an RTP stream to client station 18. As client station 18 receives the RTP stream, client station 18 may then uncover the voice from the stream and play out the voice in analog form to user B.

Similarly, client station 18 may receive voice from user B and transmit a digital representation of the voice in an RTP stream to communication server 22, and communication server 22 can then pass that digital representation along in an RTP stream to mobile station 12. As mobile station 12 receives the RTP stream, mobile station 12 may then uncover the voice from the stream and play out the voice in analog form to its user A.

Communication server 22 may also function to control communications between mobile station 12 and client station 18. For instance, communications between the stations could be half-duplex, so that each station may be restricted to either sending or receiving VoP communications at any moment and could be precluded from both sending and receiving VoP communications at the same time. To facilitate half-duplex communication, server 22 may apply a "floor control" process in which it allows only one of the stations to "speak" at once.

Further, mobile station 12, communication server 22 and client station 18 are all preferably compliant with a signaling system that they can use to set up and perhaps tear down RTP communications with each other. For example, each of the nodes may comply with the well known Session Initiation Protocol (SIP), as defined at RFC 2543.

According to SIP, a node can set up a communication session with another node by sending to the other node a SIP "INVITE" message designating the type of session requested (e.g., RTP). The other node would then respond with a SIP "200 OK" message to indicate its willingness to participate. And the first node would then complete the signaling transaction by sending a SIP "ACK" message. The two nodes may then begin to engage in the designated communication.

In a conference scenario like that shown in FIG. 1, mobile station 12 may initiate a session with client station 18 by sending an INVITE to communication server, designating client station 18 as a target participant. Before responding to mobile station 12, server 22 may then itself send an INVITE to client station 18, seeking to establish a conference leg with client station 18. Client station 18 would then respond to server 22 with a 200 OK, and server 22 would then respond to mobile station 12 with a 200 OK. Finally, mobile station 12 would send an ACK to server 22 to complete setup of a conference leg between mobile station 12 and server 22, and server 22 would then send an ACK to client station 18 to complete setup of a conference leg between server 22 and client station 18. Mobile station 12 and client station 18 could then begin engaging in real-time media communication via server 22.

To end the session, upon user request for instance, mobile station 12 or client station 18 could send a SIP "BYE" message or other sort of session-teardown message to server 22. Server 22 would then respond by sending a BYE message or other session-teardown message to the other station as well, signaling the end of the session. Communication would then stop.

Further, server 22 could maintain a session-timer that expires after a predetermined duration of no participating station sending any RTP media packets, such as when there is a long pause in the conference. When the session-timer expires, server 22 may autonomously generate and send a BYE message to each participating station, to formally end the communication session, even though neither station expressly requested an end to the session.

3. EXAMPLE MOBILE STATION COMPONENTS

Figure 2:
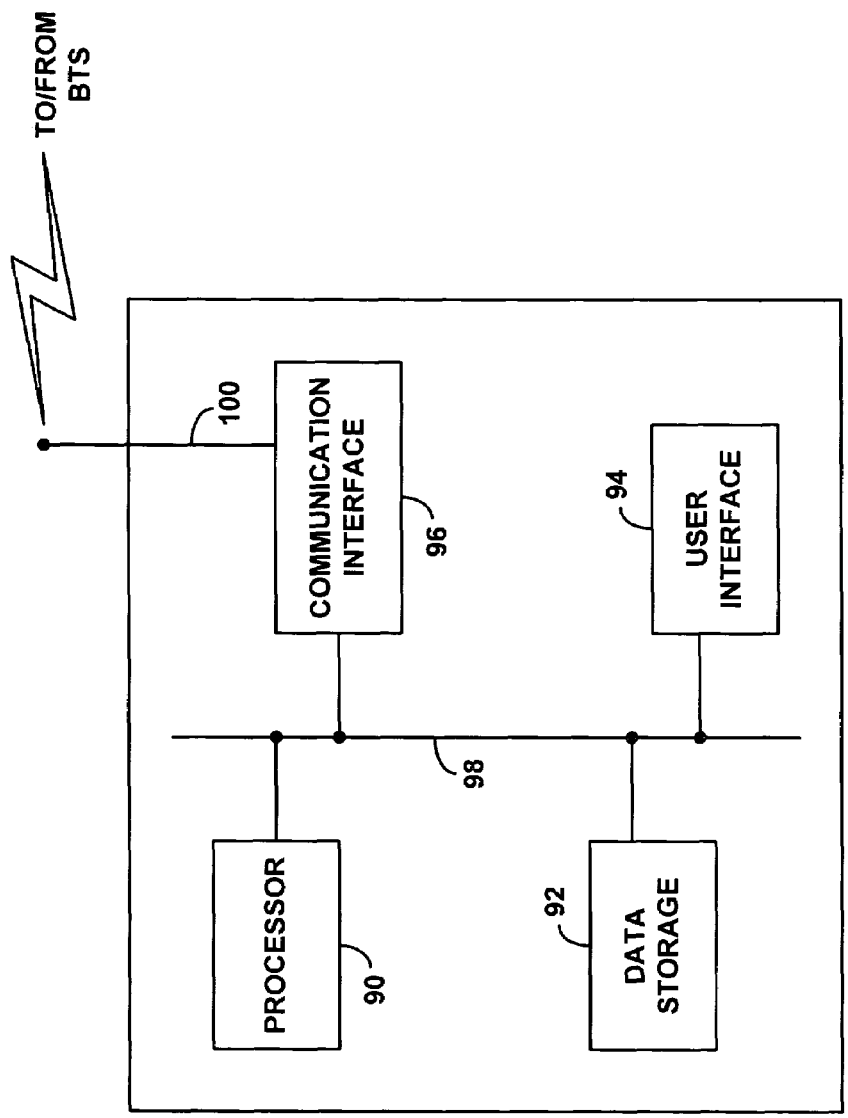
FIG. 2 is a block diagram of an exemplary mobile station that can be used in the arrangement of FIG. 1.

Referring next to FIG. 2 a block diagram of an exemplary mobile station 12 is provided, to illustrate some of the components that could be included in such a device to carry out the exemplary embodiment of the invention. As shown in FIG. 2, the mobile station 12 may include a processor 50, data storage 52, a wireless communication interface 54, and a user interface 56, all of which may be coupled together by a system bus or other mechanism 58. Each of these components may take various forms.

For instance, processor 50 could be one or more general purpose microprocessors and/or dedicated signal processors, and data storage 52 could be volatile and/or nonvolatile memory, such as flash memory or a storage drive. Wireless communication interface 54 could comprise a chipset (not shown) compliant with a desired air interface protocol such as CDMA (e.g., cdma2000), TDMA, GSM or 802.11x for instance. Further, the wireless communication interface may include an antenna 60 for sending and receiving signals over air interface 26.

User interface 56, in turn, may facilitate interaction with a user, to receive voice from a user and play out voice to a user, and to receive user instructions to initiate or conclude a session. By way of example, the user interface may include a microphone (not shown) for receiving analog speech signals from a user, and a speaker (not shown) for playing out analog speech signals to a user. Further, the user interface may include analog-to-digital conversion circuitry (not shown) for converting between analog voice signals and digital voice signals. And still further, the user interface may include a TALK (e.g., a "push-to-talk" (PTT) button), which the user can engage in order to initiate a session or to request the floor during an ongoing session.

In the exemplary embodiment, data storage 52 holds a set of logic (e.g. computer instructions) executable by processor 50 to carry out various functions described herein. (Alternatively, the logic may be embodied in firmware and/or hardware.) For example, in response to user actuation of the TALK button, if the mobile station does not currently have a radio link layer connection and a data link layer connection, the logic may cause the processor to send an origination request into radio access network 14 to acquire the necessary connection(s).

As another example, to facilitate packet-based real-time media communication, the logic may define an IP stack and logic to send and receive voice in RTP packet streams, i.e., as a sequence of RTP packets carried over UDP/IP for instance. Further, to facilitate setting up and tearing down such communications, the logic may define a SIP user agent client application.

Still further, in response to user actuation of the TALK button when mobile station 12 is not engaged in a real-time media session, the logic may cause processor 50 to send a SIP INVITE to server 22 to initiate a session with user B (station 18) and may then work as necessary to set up the requested communication. Additionally, in response to user action of the TALK button when mobile station is engaged in a real-time media session, the logic may cause processor 50 to send a floor control request to server 22 and to begin receiving voice from user A and sending an RTP stream representing the voice to server 22.

According to the exemplary embodiment, the logic in data storage 52 may then further cause processor 50 to maintain a radio link during the absence of real-time media communication. In particular, the logic would cause processor 50 (i) to detect when the mobile station has neither sent nor received real time media for a threshold period of time and (ii) to responsively send a keepalive signal into the network to maintain the radio link. Further, the logic may then cause the processor 50 to periodically continue sending keepalive signals into the network to continue maintaining the radio link.

In accordance with the exemplary embodiment, the logic will define the threshold period of time as a period that is less than the active-to-dormant timer period imposed by the radio access network 14. For instance, if the radio access network imposes an active-to-dormant timer of 10 seconds (i.e., the network would release a radio link after 10 seconds of no packet data flow over the link), then the threshold period of time applied by processor 50 would be sufficiently less than 10 seconds that sending a keepalive signal into the network will cause the radio access network to reset the active-to-dormant timer and thereby prevent the active-to-dormant timer from expiring (at least once). As a specific example, the threshold time period could be 7 seconds.

Further, the logic will preferably define the keepalive signal as particular packet data. For example, the keepalive signal could be an empty RTP packet. In this regard, according to RFC 1889, an RTP packet normally includes certain header fields (fixed header fields and, optionally, "RTP header extension" fields) and then payload data. A keepalive signal could be an RTP packet that does not include any payload data (e.g., zero length, or all zeros). As another example, a keepalive signal could be a SIP message, or a PING request, or, for that matter any sort of packet data that would be enough to cause the radio access network to reset the active-to-dormant timer.

The mobile station may send the keepalive signal into the radio access network for transmission, in turn, into the packet-switched network. In the exemplary embodiment, the logic could cause the keepalive signal to be sent to any IP address. However, a preferred destination for the keepalive signal is an IP address of the communication server 22. Sending the keepalive signal to an IP address of the communication server would be worthwhile, as it would notify the communication server that the participating station is still engaged in the session.

4. EXAMPLE OPERATION

Figure 3:
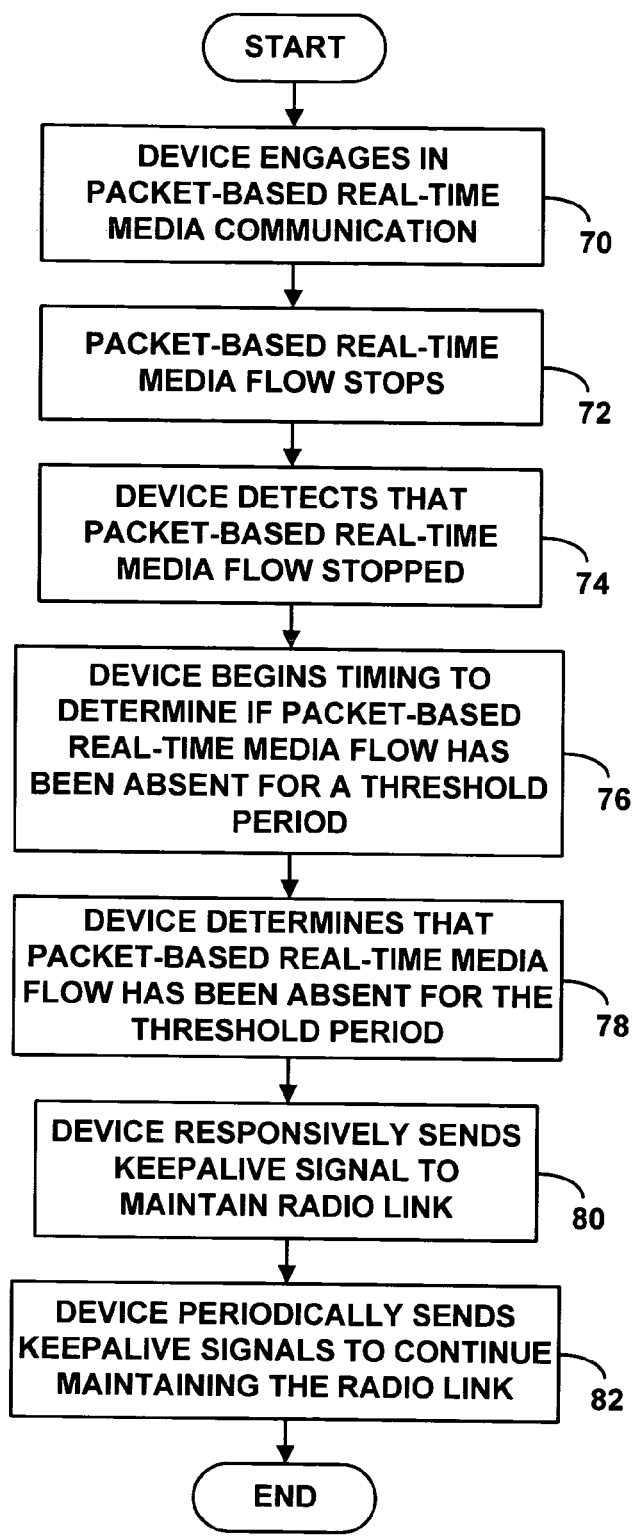
FIG. 3 is a flow chart depicting functions that can be carried out in accordance with the exemplary embodiment.

Referring next to FIG. 3, a flow chart is provided to help illustrate some of the functions that can be carried out in accordance with the exemplary embodiment. The process begins at step 70 with a wireless device such as mobile station 12 engaging in packet-based real-time media communication, such as sending or receiving an RTP media stream for instance. At step 72, the packet-based real-time media flow stops. That is, the flow of packet-based real-time media to and from the wireless device stops.

At step 74, the wireless device detects that the packet-based real-time media flow stopped. For instance, if mobile station 12 had been sending an RTP stream into the network at step 70, processor 50 may detect that continuous generation and transmission of RTP packets has been interrupted. Or if the mobile station had been receiving an RTP stream from the network, processor 50 may detect that continuous receipt of RTP packets has been interrupted.

At step 76, the wireless device responsively begins timing to determine if packet-based real-time media flow has been absent for a threshold period of time. In turn, at step 78, the device determines that the packet-based real-time media flow has been absent for the threshold period of time. In response, at step 80, the device sends a keepalive signal into the network to maintain the radio link (e.g., to reset the active-to-dormant timer imposed by the network). Further, at step 82, the device may then continue to periodically send a keepalive signal into the network, to continue maintaining the radio link.

4. EXAMPLE ADVANTAGES

The exemplary embodiment can provide several advantages. First, if a long pause occurs during a packet-based real-time media session, the exemplary embodiment can prevent a participating wireless device from losing its radio link and then having to re-acquire the link when communication resumes. Second, when a packet-based real-time media session ends (e.g., when the participants voluntarily end the session or when a communication server ends the session), the exemplary embodiment can allow a participating wireless device to keep its radio link and to therefore be able to initiate a new packet-based real-time media session if desired, without the need to re-acquire a radio link.

Third, in a scenario where a communication server ends a packet-based real-time media session due to inactivity in the session, the exemplary embodiment can avoid having to establish a radio link with a participating mobile station merely to send the mobile station a SIP BYE message (or other session-teardown message). That is, absent the exemplary embodiment, if the communication server applies a session timeout timer that is longer than the active-to-dormant timer imposed by the radio access network, then a long pause in communication could (i) first cause a participating mobile station to first lose its radio link and (ii) then cause the communication server to send a BYE message to that mobile station. In order for the radio access network to send the BYE message to the mobile station, the mobile station would have to re-acquire a radio link. By having the mobile station maintain its radio link during absence of real-time media communication, this scenario can be avoided.

5. CONCLUSION

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
   establishing a radio link layer connection between a radio access network and a wireless communication device, wherein the radio access network applies a radio link timer to the radio link connection, wherein the radio access network provides connectivity with a packet-switched network;
   establishing a data-link layer connection over which data can be communicated between the wireless communication device and the radio access network;
   detecting that the wireless communication device has neither sent nor received packet-based real-time media over the data-link layer connection for a threshold period of time; and
   responsive to the detecting, sending from the wireless communication device into the radio access network at least one keepalive signal, wherein the at least one keepalive signal resets the radio link timer,
   wherein sending the keepalive signal into the radio access network comprises sending the keepalive signal into the radio access network for transmission of the keepalive signal, in turn, from the radio access network to a destination in the packet-switched network, and
   wherein the keepalive signal is an empty Real-time Transport Protocol (RTP) packet.

2. The method of claim 1, wherein the destination in the packet-switched network is a communication server that bridges voice-over-packet communications between the wireless communication device and one or more other devices.

3. The method of claim 1, wherein the wireless communication device includes a push-to-talk button.

4. The method of claim 1, wherein sending at least one keepalive signal comprises periodically sending keepalive signals.

5. The method of claim 4, wherein the radio link timer defines a radio-link timeout period, and wherein periodically sending keepalive signals comprises:
   sending keepalive signals at a period that is shorter than the radio-link timeout period.

6. The method of claim 1, wherein, the wireless communication device communicates with the radio access network over a radio-link, and wherein sending at least one keepalive signal into the radio access network comprises:
   sending keepalive signals into the radio-access network in order to hold open the radio link layer connection.

7. A system for maintaining a radio link assigned to a cellular mobile station, the system comprising:
   means for detecting that the cellular mobile station has neither sent nor received packet-based real-time media for a threshold period of time; and
   means, responsive to the detecting, for sending from the cellular mobile station into a radio access network at least one keepalive signal,
   wherein the radio access network applies a radio link timer to the radio link connection and provides connectivity with a packet-switched network, wherein sending of the keepalive signal causes the radio link timer to be reset,
   wherein sending the keepalive signal into the radio access network comprises sending the keepalive signal into the radio access network for transmission of the keepalive signal, in turn, from the radio access network to a destination in the packet-switched network, and
   wherein the keepalive signal is an empty Real-time Transport Protocol (RTP) packet.

8. The system of claim 7, wherein the destination in the packet-switched network is a communication server that bridges voice-over-packet communications between the wireless communication device and one or more other devices.

9. The system of claim 7, wherein the cellular mobile station includes a push-to-talk button.

10. The system of claim 7, wherein sending at least one keepalive signal comprises periodically sending keepalive signals.

11. The system of claim 10, wherein the radio link timer defines a radio-link timeout period, and wherein periodically sending keepalive signals comprises:
sending keepalive signals at a period that is shorter than the radio-link timeout period.

12. A cellular mobile station comprising:
a processor; and
a wireless communication interface,
wherein the processor is programmed to make a determination that the cellular mobile station has neither sent nor received real-time media over a data-link layer connection for a threshold period of time, and
wherein the processor is programmed to respond to the determination by sending at least one keepalive signal via the wireless communication interface into a radio access network, wherein the radio access network provides connectivity with a packet-switched network,
whereby sending a keepalive signal from the cellular mobile station into the radio access network causes the radio access network to reset a radio-link timeout timer for a radio link assigned to the cellular mobile station,
wherein sending the keepalive signal into the radio access network comprises sending the keepalive signal into the radio access network for transmission of the keepalive signal, in turn, from the radio access network to a destination in the packet-switched network and
wherein the keepalive signal is an empty Real-time Transport Protocol (RTP) packet.

13. The cellular mobile station of claim 12, wherein the destination in the packet-switched network is a communication server that bridges voice-over-packet communications between the cellular mobile station and one or more other devices.

14. The cellular mobile station of claim 12, further comprising a push-to-talk button.

15. The cellular mobile station of claim 12, wherein the processor is programmed to periodically send keepalive signals into the radio access network in response to the determination.

16. The cellular mobile station of claim 15, wherein the radio-link timeout timer has a timeout period, and wherein the processor is programmed to send the keepalive signals into the radio access network at a period that is shorter than the timeout period.

17. A communication system comprising:
a mobile station having a processor, data storage, a user interface, a push-to-talk button, and a wireless communication interface;
a radio access network that communicates with the mobile station over an air interface and that provides connectivity between the mobile station and a packet-switched network, wherein a communication server sits on the packet-switched network and functions to bridge voice-over-packet communications between the mobile station and one or more other devices, wherein the radio access network is arranged to establish a radio link layer connection with the mobile station over the air interface and to release the radio link layer connection after a predefined period of time during which no packet-data is communicated to or from the mobile station over a data link layer connection via the air interface;
wherein the mobile station is arranged (i) to detect that no packet data has been sent to or from the mobile station for a threshold period of time that is less than the predefined period of time, and (ii) to responsively transmit packet data as a keepalive signal over the air interface to reset the radio link timer, wherein the mobile station sends the packet data as the keepalive signal to the radio access network for transmission in turn from the radio access network to the communication server on the packet-switched network, and wherein the packet data sent as the keepalive signal is an empty Real-time Transport Protocol (RTP) packet.

* * * * *

UNITED STATES PATENT AND TRADEMARK OFFICE
CERTIFICATE OF CORRECTION

PATENT NO. : 7,573,867 B1  Page 1 of 1
APPLICATION NO. : 10/623439
DATED : August 11, 2009
INVENTOR(S) : David Welch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1757 days.

Signed and Sealed this

Seventh Day of September, 2010

David J. Kappos
*Director of the United States Patent and Trademark Office*